United States Patent [19]
Nicholas

[11] Patent Number: 5,786,437
[45] Date of Patent: Jul. 28, 1998

[54] ONE-STEP SEALANT BASED ON ELECTRONEGATIVELY SUBSTITUTED PHENOLIC BLOCKING AGENTS AND ALIPHATIC ISOCYANATES PROVIDING FAST CURES AND IMPROVED STABILITY

[75] Inventor: Paul Peter Nicholas, Broadview Heights, Ohio

[73] Assignee: Tremco Incorporated, Beachwood, Ohio

[21] Appl. No.: 792,020

[22] Filed: Jan. 31, 1997

Related U.S. Application Data

[60] Division of Ser. No. 280,036, Jul. 25, 1994, abandoned, which is a continuation-in-part of Ser. No. 44,856, Apr. 8, 1993, abandoned.

[51] Int. Cl.$^6$ ........................................ C08G 18/80
[52] U.S. Cl. ........................... 528/45; 528/59; 528/75; 528/76; 528/80; 528/85
[58] Field of Search ...................... 528/45, 59, 75, 528/76, 80, 85

[56] References Cited

U.S. PATENT DOCUMENTS

| | | |
|---|---|---|
| 4,038,239 | 7/1977 | Coyner et al. .......................... 528/53 |
| 5,173,560 | 12/1992 | Gras et al. ............................. 528/45 |
| 5,284,918 | 2/1994 | Huyuh-Tran et al. ................... 528/45 |

OTHER PUBLICATIONS

CA: 95:8,922 (Corresponding to JP-56-010,521 Feb. 1981.

*Primary Examiner*—John M. Cooney, Jr.
*Attorney, Agent, or Firm*—Calfee, Halter & Griswold LLP

[57] ABSTRACT

One-step sealant compositions are provided which have a moisture-activated curative component and an aliphatic isocyanate-terminated polyol component blocked with a phenol substituted with an electron-withdrawing group having a Hammett $\sigma_p$ constant in the range from >0.24 to about 0.73. In this range, the blocking phenol is rapidly displaced by an amine group so that the sealant cures in less than one-half the time required for an analogous sealant in which end-capping is performed with an aromatic polyisocyanate. Yet the novel sealant is also stable for more than twice as long, in excess of nine months, when sealed under nitrogen in a container and stored at 25° C. and 50% relative humidity. Sealants of this invention thus provide both, a desirable fast cure rate of less than 8 hr to cures to a viscosity of 100,000 cp in a 50% relative humidity atmosphere at 25° C., and exceptional stability when stored. Such sealants are particularly desirable because the improvement in rate of cure and in shelf life is relatively insensitive to the specific aliphatic polyisocyanate or the polyester or polyether polyol used.

16 Claims, 1 Drawing Sheet

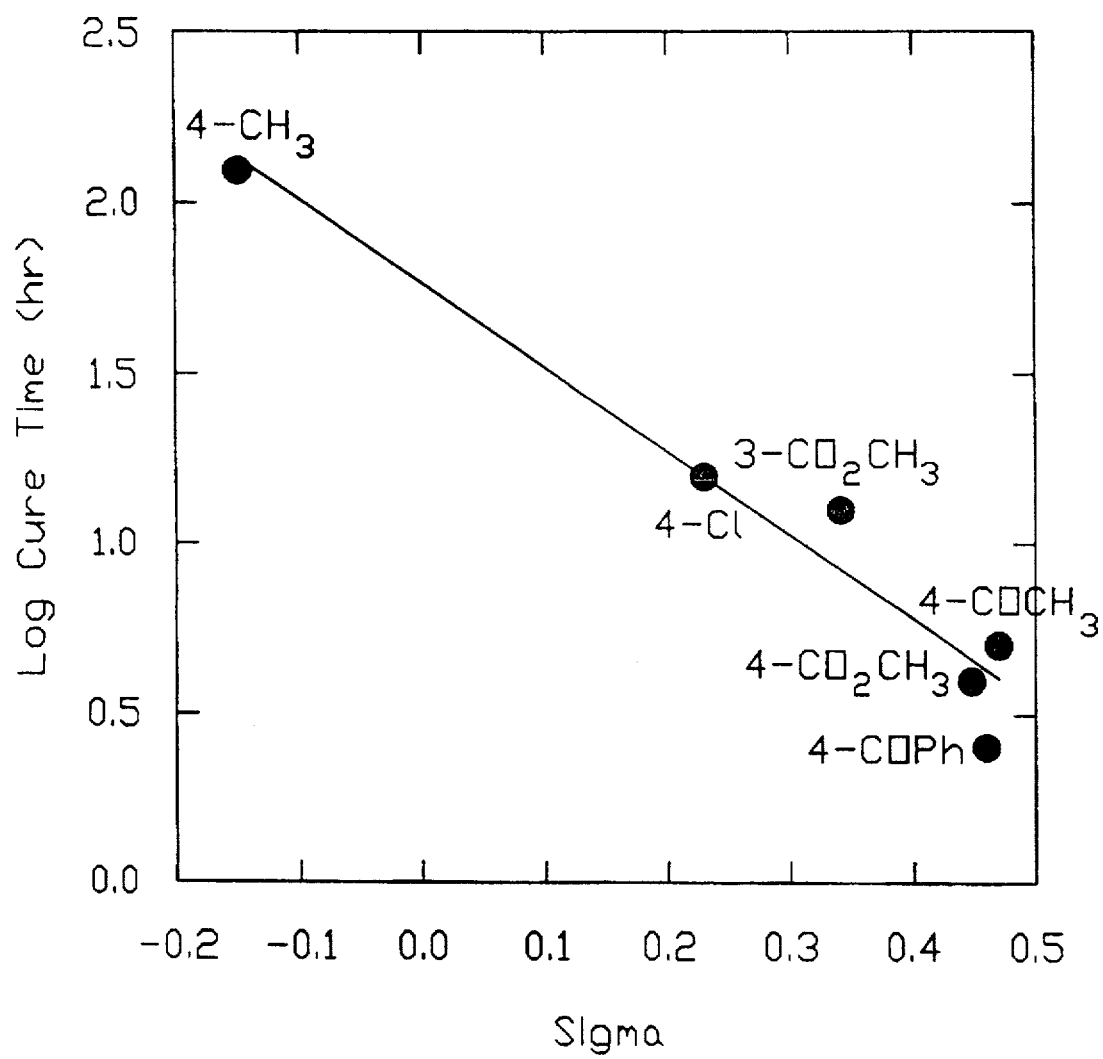
Figure 1. Hammett Correlation of Cure Time With σ

ONE-STEP SEALANT BASED ON ELECTRONEGATIVELY SUBSTITUTED PHENOLIC BLOCKING AGENTS AND ALIPHATIC ISOCYANATES PROVIDING FAST CURES AND IMPROVED STABILITY

This is a continuation of patent application Ser. No. 08/280,036 filed on Jul. 25, 1995, which is now abandoned which is a continuation-in-part application of Ser. No. 08/044,856 filed Apr. 8, 1993, which is now abandoned.

BACKGROUND OF THE INVENTION

Moisture-curable or moisture-activatable polyurethane sealants are directly applied as pastes, or viscous fluids between surfaces to be adhesively secured, and the sealants are cured in air under ambient conditions in the presence of atmospheric moisture. A "one-step" sealant contains all necessary polymerizable components so designed as to chain extend and crosslink as the sealant is "cured". A 'one-step' sealant is also referred to in the art as a 'one-part', 'one-package' or 'one-component' sealant, but it will be referred to herein as a "one-step" sealant since it manifestly contains plural components or parts. A "two-step" sealant mixture requires that at least one of the components essential for the curing process, be added just prior to using the mixture. One-step sealants are preferred over two-step sealants, which require inconvenient, if not burdensome mixing just prior to their immediate use.

Whether a one-step or two-step sealant, the cured sealant will not be deemed usable for a particular purpose unless it meets certain criteria. Tensile properties of the sealant within a defined temperature range, its adhesion to particular substrates, its stability toward thermal, hydrolytic and ultraviolet degradation, and other physical and chemical properties, are essential considerations which define the operability of the sealant. However, there are two other essential properties which determine whether a moisture-activated sealant will even be evaluated for its cured properties. These essential conditions are (a) sufficient stability to provide long "shelf life", allowing the unreacted sealant to be stored in a closed container until it is to be used, and (b) a sufficiently fast cure rate to meet the demands of the application once the sealant is applied in an ambient atmosphere of moisture-containing air. The terms "cure rate" or "curing rate" refer to the length of time required for a one-step curable sealant to cure to a Durometer hardness of Shore A 45 when the sealant is exposed to air at 25° C., 50% relative humidity (RH), for brevity, 50% RH air @ 25° C., unless stated otherwise. The terms "shelf life", "shelf-stability", "one-step stability" and "stored" refer herein to storage of the one-step sealant, sealed under an inert gas atmosphere, usually nitrogen, in a container such as a tube for a caulking gun, at room temperature ($\approx$25° C.) in a 50% RH atmosphere, unless stated otherwise.

This invention relates to a moisture-curable, one-step polyurethane sealant composition ("sealant" for brevity) and more particularly pertains to one in which not only the rate of cure has been enhanced, but the shelf life (stability when stored) simultaneously improved. More particularly, the invention relates to those one-step sealants made with prepolymers in which a polyol terminated with an aliphatic polyisocyanate, rather than an aromatic polyisocyanate, and blocked with a phenol. An aliphatic polyisocyanate is defined as one in which each isocyanate group is attached to a saturated carbon atom. The term "blocked" refers to a process of reacting an isocyanate-terminated prepolymer with a blocking agent which inhibits the reaction with moisture in air at room temperature (25° C.), but which will "unblock" and react with an amine moiety generated by a moisture-activated curative for isocyanate-terminated polymers at room temperature. The reason for blocking the prepolymer is to provide a curable mixture which is far more stable than the unblocked prepolymer when stored. An unblocked prepolymer cannot be stored for more than a few hours, at most a couple of days. A blocked prepolymer of the most preferred embodiments of U.S. Pat. No. 4,507,443 to Barron et al can be stored under the same conditions for months.

Specifically, the invention relates to the choice and the motivation for choosing the correct combination of two variables from among the many possible combinations which control the cure rate and shelf life of the very large number of embodiments of a one-step sealant mixture disclosed in th '443 patent.

A polyurethane sealant which relies upon a moisture-activated curative component to cure a "blocked" isocyanate prepolymer is disclosed in U.S. Pat. No. 5,124,372 to Katona et al which specifically teaches a non-sagging composition. A polyurethane powder coating prepolymer, which is cured by heating in the absence of moisture to a high enough temperature to cause the powder to flow, is taught in U.S. Pat. No. 5,210,127 to Werner et al, inter alia.

Achieving both fast cure and long shelf life in a one-step moisture-activated polyurethane sealant is a problem never addressed in either the '443 patent or in any other relevant prior art teaching. The main technical advance in the '443 invention was the one-step sealant. Barron et al satisfied the need for a polyurethane sealant which is supplied in a single container (can or cartridge), and which eliminates the difficulties associated with a two-part sealant recipe. Having done this, Barron et al deemed the results satisfactory, and they reported no investigation of the variables which control cure rate and shelf life.

Though the '443 patent reads on all polymerizable isocyanate-terminated prepolymers which are "blocked" with a substituted phenol group, there is no suggestion that any of such blocked prepolymers in combination with a multifunctional imine might have less than desirable shelf life or curing rate. Moreover, one deciding to improve both the shelf life of the sealant as well as the speed with which it cures, would not know, sua sponte, whether to modify the components of the ketimine, the components of the prepolymer chain, the blocking group, or the conditions under which the container is filled with sealant, e.g. under a nitrogen blanket, or stored, e.g. at subfreezing temperatures from 0° C. to about −25° C., or both. In the choice of the ketimine alone, there is a myriad of choices; and there are at least as many choices in the selection of a substituent on a phenyl blocking group. It was not obvious what factors were the dominant ones, nor was it evident that the manipulation of only two of them might provide both rapid cure rates and long shelf life. Still further, there is nothing in the prior art to indicate that it is only a combination of an aliphatic diisocyanate end-capped with a substituted phenol ring having particularly characterized substituents, which provide the most desirable combination of rapid cure rate and extended shelf life.

More particularly, the '443 sealant comprises a blocked prepolymer derived from an aromatic or aliphatic isocyanate blocked with a variety of substituents, and a hydrolyzable, imine curative. Because it was known that polyols end-capped with an aliphatic isocyanate produce curable sealants with a slow cure rate, the '443 patent used an aromatic diisocyanate in each of its examples. A blocked prepolymer of poly(propylene oxide) ("PPO") and a mixture of 2,4- and 2,6-toluene diisocyanate ("TDI") was prepared as follows:

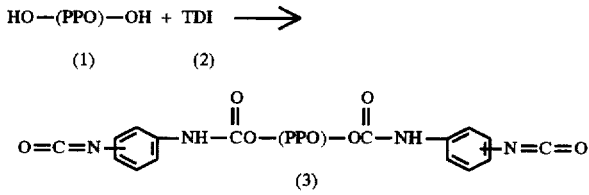

Isocyanate-capped PPO is blocked with a blocking agent such as a phenol, thus:

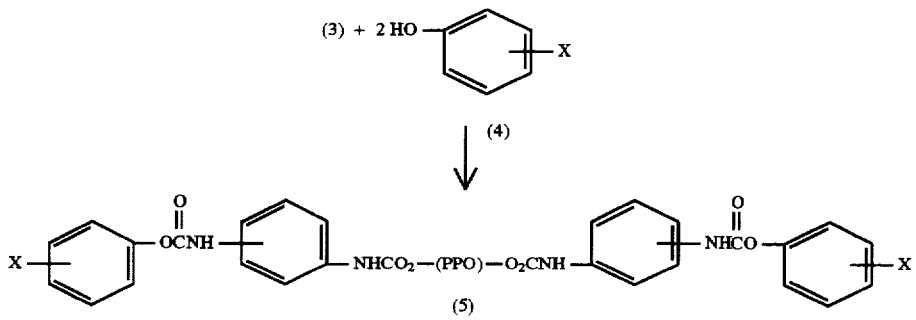

A ketimine derived from methylisobutyl ketone used is represented by the structure:

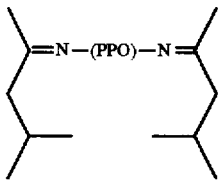

It is a mixture of (5) and (6) which must be stable.

Though Barron et al recognized the importance of storage stability, they provide no indication as to what factors may have influenced it, for better or for worse. Similarly, they measured the time of cure for several illustrative sealants they prepared, but provide no suggestion as to what factors might influence cure rate.

The lack of any teaching as to which of the many factors capable of influencing either stability or rate of cure, is evident in how these properties are reported. An aliphatic (polypropylene ether triol) isocyanate prepolymer blocked with 3-methoxy phenol ("3-MP" for brevity) and cured with a ketimine derived by reacting a polyoxypropylene diamine with methylisobutyl ketone, provided a curable sealant with a storage life of six months at 25° C. when stored in a caulking cartridge in an atmosphere having a relative humidity of 50% (see example I, col 6, lines 43–45); and, when exposed to that atmosphere, cured in 3 weeks to acceptable hardness. The 3-MP blocked prepolymer was cured in example II with the same ketimine used in example I, to a hardness of Shore A 31 after 3 weeks in 50% relative humidity (RH) air. In examples II and III, with the same 3-MP and ketimine used before, the sealant cured under the same conditions, 3 weeks at 50% RH, to hardnesses of Shore A 40 and 45, respectively.

It is known that reactions that develop a negative charge in the transition state at a reaction center attached to a phenyl ring are accelerated by dipoles directed away from the ring (electron-withdrawing groups). There is no teaching in the art showing that structures like (5) involve such a transition state upon chain extension with amines at room temperature. Other reactions where displacement of the blocking group occurs include hydroxide-catalyzed hydrolysis of polyurethanes having a molecular weight <1000, and high-temperature (≈200° C.) chain extension with polyols. Both are accelerated with electron-withdrawing substituents. But even if the cure rate was increased in this way with compositions like (5)+(6), one would reasonably expect that such substituents would also cause the stability of the one-step sealant to decline.

In the Werner et al '127 patent, the isocyanate is blocked with an ester-substituted phenol. But there is no indication that this affected either the rate of cure or the shelf life of the product, if it was stored. Moreover, the blocked polyisocyanate was directly cured by reaction with a polyol, not an amine, at high temperature, ≈200° C. There is no moisture present nor is any required to be generated for the cure. The blocking suggested by Werner et al is for the polyisocyanate to thermally cure polyols they use. Their blocked polyisocyanate is a relatively small molecule compared with a prepolymer having a minimum molecular weight of 1000. Since Werner et al state they chose the ester-substituted phenol because it was known to thermally deblock at a relatively low temperature, they had no reason to suggest that any substituted phenol might affect either cure rate or shelf-stability. In particular, they state that p-hydroxybenzoic acid ethyl ester is selected because of its "low cleavage temperature". The choice has no relevance to the chemistry of the sealant composition herein.

There is no suggestion in Werner et al that the effect of their suggested blocking would be discernible in the cure rate of their prepolymer with a polyol; nor that the same blocking would be effective to modify the cure rate when the reaction of the blocked prepolymer was to be with an amine instead of with an OH group. Werner et al do not suggest that any specific OH-terminated polymer, much less a polyether polyol, polyester polyol, or other analogous polyol in the molecular weight range from 1000 to about 18,000, be end-capped with a polyisocyanate, then blocked; or, that such blocking might accelerate chain extension with an amine generated by hydrolysis of an imine. Nor could there be, since moisture was not a consideration with Werner et al, nor is there any mention of the cure rate or the storage stability of the mixture. Therefore there is no reason to interject the notion that such a mixture be stored. It is now evident that the background against which Werner et al made their invention failed to provide the impetus which would lead one skilled in the art to explore the effect of choosing particular polyisocyanates and investigating the effect of particular substituents on phenols which could be used as blocking agents in the present invention.

The effect of several substituents on the thermal dissociation of simple phenylurethanes is described in Wicks, Jr.; and, it is known that the dissociation constant of simple phenyl-n-phenyl carbamates approximately correlates with their Hammett constants "$\sigma_p$". But there is no indication that higher $\sigma_p$ would decrease cure time for moisture-activated, room temperature cures of sealant compositions such as (8) and (9) below. For example, it is not taught that deblocking is a required first step because direct displacement of the blocking agent by the amine is probable. In such a case, deblocking kinetics would not apply. Moreover the cure rate might be limited by the transport rate of water, or hydrolysis of the imine (9); and, if electron-withdrawing substituents increase the cure rate but decrease shelf life, it is logical to conclude that there would be no purpose in seeking more highly electron-withdrawing substitutents than ones found by Barron et al to give an adequate combination of storage stability and cure rate.

There is no suggestion that strong electron-withdrawing groups could be put to good use in a blocked polyol prepolymer for any purpose whatsoever. Since an enhancement of cure rate would likely cause shelf life to respond in the opposite direction, the art would have to contain an unequivocal suggestion that in a room temperature, moisture-activated sealant composition such as (5)+(6), the choice of an aliphatic polyisocyanate instead of an aromatic isocyanate to furnish the NCO groups in the prepolymer would serve to off-set the destabilizing effect of an electron-withdrawing substituent so greatly that a combination of high cure rate and long shelf life could be achieved.

SUMMARY OF THE INVENTION

It has been discovered that, for a moisture-curable sealant in a one-step mixture of a "blocked" prepolymer having a molecular weight in the range from about 1000 to about 18,000, and a ketimine or aldimine curative, a substituent on a phenol blocking agent strongly influences both the cure rate and shelf life. A substituent which contains dipoles directed away from the ring (electron-withdrawing groups) accelerates cure of the sealant, but also simultaneously accelerates reactions which cause instability. Unexpectedly however, it is found that using an aliphatic diisocyanate in lieu of an aromatic diisocyanate greatly off-sets the destabilizing effect of electron-withdrawing substituents. High cure rates, approaching those of unblocked polyisocyanates, can be achieved together with greatly improved one-step stability as compared with the system derived from an aromatic polyisocyanate, the stability being improved irrespective of the blocking phenol substituent, including nonyl.

It is therefore a general object of this invention to provide a one-step polyurethane sealant admixture, having improved cure rate and one-step stability, comprising a blocked aliphatic isocyanate-terminated prepolymer component wherein essentially all, preferably at least 85%, and always at least 70% of the NCO groups on the isocyanate end-capped prepolymer, are blocked by reaction with a phenol containing a strongly electron-withdrawing substituent; and, a multifunctional imine curative component. The contribution thus made to the art is a one-step polyurethane sealant which cures at ambient atmospheric conditions to a viscosity of 100,000 cp in less than one-half the time required for an analogous sealant in which the prepolymer is end-capped with an aromatic polyisocyanate and blocked with a phenol containing an alkyl substituent (control), and can be stored, when sealed under nitrogen in a container, for at least twice as long, at 25° C. and 50% RH, usually more than one year under such actual test. From correlations with accelerated testing at 125° F. in a convection oven, it is expected that the novel sealant can be stored for as much as two years at room temperature. It has been found that electron-witdrawing substituents on the blocked prepolymer (5) derived from an aromatic polyisocyanate result in very fast cures but provide unacceptably short shelf stability, typically less than one-half that of an alkyl-substituted phenol.

It is a specific object of this invention to provide a reactive mixture of a polymeric polyol end-capped with an aliphatic diisocyanate and blocked with a phenol group having a substituent which is sufficiently electron-withdrawing, as quantified by the Hammett $\sigma_p$ constant, to overcome the disadvantages of using an aliphatic polyisocyanate which is known to contribute to a slow cure, but also to largely suppress the contribution of the electron-withdrawing group to poor storage stability at ambient temperature.

It is another specific object of this invention to provide a sealant in which the the isocyanate-terminated polymeric polyol is blocked with a phenol group in which a substituent at the 4-position of the phenyl ring has a $\sigma_p$ in the range from 0.33 to 0.73. The contribution the inventor has made to the art, which contribution has resulted in this invention, is the discovery that the electron-withdrawing strength of such a substituent has a major influence on both cure rate and shelf life, even with a relatively long chain polyol having a molecular weight in the range from 1000 to 18000, provided that the electron-withdrawing strength, as quantified by a Hammett constant $\sigma_p$ is in the range from greater than 0.24 to ≈0.73. Though any polyol in the specified range is operable, practical polyols are selected from the group consisting of a polyester polyol, a polyether polyol, a polyurethane polyol or a hydroxyl-terminated polybutadiene, containing from 2 to 6 OH groups per mol, preferably from 2 to 3.

A method is provided for preparing a moisture curable, ambient temperature activated, one-step curable polyurethane sealant having extended shelf life and accelerated curing time relative to an analogous sealant in which the prepolymer consists essentially of a polymeric polyol terminated with an aromatic polyisocyanate and blocked with a substituted phenol group having an alkyl substituent, the method comprising, (a) blocking an isocyanate-terminated polyol with a substituted phenol wherein substituent X on the phenyl group has a Hammett constant $\sigma_p$ in the range from >0.24 to ≈0.73 to yield blocked a prepolymer (8) in which at least 85% of the NCO groups are blocked; and, (b) mixing the blocked prepolymer with a multifunctional imine essentially free of amine functionality formed by the condensation reaction between a primary multifunctional amine with a ketone or aldehyde, the multifunctional amine defined in (9) below; and, (c) sealing the sealant in a container under an inert gas atmosphere; whereby, the sealant in the container has a shelf life of at least nine months and preferably at least 1 year, at 25° C. in a 50% relative humidity atmosphere; and, when the sealant is applied and exposed to the ambient atmosphere, it cures to a viscosity of 100K cp in less than 8 hr.

BRIEF DESCRIPTION OF THE DRAWING

The FIGURE is a graph showing a correlation of a Hammett constant $\sigma_p$ for various substituents as a function of the time required to cure a one-step sealant having a number average molecular weight of about 4700 in a composition comprising a blocked prepolymer and an imine curative, in which composition only the substituent on the phenyl blocking group is changed from one run to the next.

DETAILED DESCRIPTION OF PREFERRED EMBODIMENTS

Whichever type of sealant is used, bonding occurs to most contacted surfaces, and upon curing, the sealant is transformed from a viscous, workable liquid to a resilient, and often, elastomeric solid. The curing process is generally not reversible, and once the sealant is applied and allowed to cure, it generally cannot be removed and re-applied. The sealant in the cured state should have sufficient elasticity and flexibility to withstand expansions and contractions of joints to which it is bonded during temperature variations experienced as a result of climatic changes and to withstand forces that cause the joints to flex or twist.

Prepolymers for the curable sealant are most preferably formed by reacting a OH-terminated polyether or polyester having a number average molecular weight of about 1,000 to 18,000, preferably 1,000 to 8,000, having from 2 to about 6 OH groups per chain, with an aliphatic diisocyanate to yield the isocyanate-terminated prepolymer

(7)

Typical OH-terminated polymers include OH-terminated polyesters, polyether diols and triols, OH-terminated urethanes derived from aromatic or aliphatic polyisocyanates and OH-terminated polybutadienes.

The blocked isocyanate-terminated prepolymers used in the present invention can be represented by the following structural formula (8):

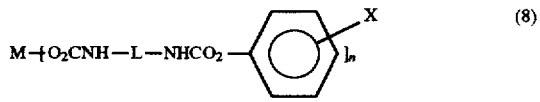
(8)

wherein, n represents a number $\geq 2$, preferably in the range from 2 to 6, and most preferably in the range from 2 to 3;

M represents a polymeric residue derived from a hydroxyl-terminated polyol $M(OH)_n$ selected from the group consisting of a polyether polyol, a polyester polyol, a polyurethane polyol and a hydroxyl-terminated polybutadiene;

L is the organic residue of an aliphatic diisocyanate $L(NCO)_2$;

X represents said substituent, preferably at the 4-position of the phenyl ring.

Aliphatic isocyanate groups are linked by L, which is an aliphatic, including alicyclic radical so that the blocked prepolymer is free of aromatic isocyanate end-caps. The aliphatic isocyanate has at least 2, and preferably from 2 to 3 isocyanate groups each of which may end-cap the hydroxyl-terminated polyol used. Suitable aliphatic diisocyanates include, but are not limited to, isophorone diisocyanate (IPDI), trimethylhexamethylene diisocyanate (TMHD), hydrogenated m-xylene diisocyanate, and 1,3-bis(isocyanatomethyl)cyclohexane ($H_6XDI$).

The aliphatic isocyanate-terminated prepolymer (7) may be prepared by mixing, using conventional means, the hydroxyl-terminated polymer and aliphatic isocyanate at ambient temperature and pressure, although the reaction rate is significantly increased at higher temperatures, for example, between 60° C.–110° C. and in the presence of a suitable catalyst. An excess over stoichiometric of the polyisocyanate ensures that the terminal OH groups of the polymer are as fully converted to the carbamate as practical. As explained hereinabove, in order to provide a prepolymer that is more stable during storage, the isocyanate-terminated prepolymer (7) described above is then "blocked" with a substituted phenol to produce the prepolymer (8). The blocked prepolymer must not readily react with moisture in the air at room temperature (25° C.), but will "unblock" when cured with the appropriate moisture-activated curative. The one-step sealant composition is then obtained by combining the blocked prepolymer (8) and the imine curative (9) in the correct proportions, typically 0.80–1.1 equiv imine/equiv NCO where equiv NCO is the sum of blocked and free isocyanates.

Examples of suitable polyether polyols include those derived from poly(ethylene oxide), poly(propylene oxide), poly(tetramethylene glycol), and their copolymers. Poly(propylene oxide) polyols are most preferred.

Suitable OH-terminated polyesters include OH-terminated polyesters prepared from polybasic acids or anhydrides, for example adipic acid and phthalic anhydride, and polyols in which the hydroxyl functionality of the polyester prepolymer is $\geq 2$, preferably in the range from 2 to 6. In addition, simple diols and triols having a molecular weight <1000 can be blended with the polyol in an amount <20% by weight. Higher levels of such polyols comprising relatively small molecules, such as ethylene glycol, 1,4-butanediol, and 1,6-butanediol are unsuited for this invention.

The isocyanate-terminated prepolymer (7) is readily converted to the blocked prepolymer (8) which has a carbamate linkage at each end produced by reaction of (7) with the appropriately substituted phenol (4).

The curative component is a multifunctional imine formed by the condensation of a primary, multifunctional amine with an aldehyde or ketone, the curative represented by:

(9)

wherein, Q is an organic radical having a molecular weight from about 26 to 10,000;

m is an integer $\geq 2$, preferably in the range from 2 to 4; and, $R^1$ and $R^2$ are independently selected from the group consisting of H, $C_1$–$C_{10}$-alkyl, phenyl, and $C_1$–$C_6$ alkyl-substituted phenyl.

It is only when substituent X on the phenyl ring in (8) has a Hammett constant $\sigma_p > 0.24$ that these carbamates provide an attractive balance between cure rate and one-step stability.

An experimental investigation of the effect of $\sigma_p$ shows that X=Cl defines the approximate lower limit where the time of cure corresponding to a $\sigma_p$ of 0.24 is slightly slower than that obtained with (5) where X=nonyl, which serves as the control. Particularly desirable substituents have $\sigma_p$ in the range from about 0.35 to about 0.73 and include carbonyl-containing groups such as —COR (acyl), —$CO_2R$ (ester), —COH (formyl), and, sulfur-containing groups such as —$SO_2R$ (sulfonyl) and —SOR (sulfinyl), wherein R is an aliphatic or alicyclic $C_1$–$Cl_{12}$ group, or an aromatic $C_6$–$C_{20}$ group. Preferred substituents are the sulfinyl and ester groups wherein R is an aliphatic $C_1$–$C_6$ group, or an aromatic $C_6$–$C_{12}$ group.

In general, substituents in the 4-position of the phenyl ring give faster cures than those in the 3-position. With 2-substituted phenols, blocking can be difficult to achieve, especially with carbonyl-bearing functional groups. One skilled in the art will appreciate that multiple electron-withdrawing substituents would be expected to give further rate enhancements, up to a practical limit. Thus, in the blocked prepolymer formula (8), the plural substituents may be present, typically only 2, and they may be different so that each may exert the same electron-withdrawing effect, or different.

The radicals $R^1$ and $R^2$ in the imine curative (9) are each independently selected from the group consisting of hydrogen, an alkyl having from 1 to 10 carbon atoms, and unsubstituted or alkyl substituted phenyl, and wherein Q is an organic radical having a molecular weight from about 26 to 10,000. Preferably the imine is formed by the condensation of a primary di- or triamine with a ketone (to form a ketimine) or aldehyde (to form an aldimine). $R^1$ and $R^2$ may be the same or different. The curative can be prepared by refluxing the primary amine and ketone or aldehyde together in the presence of an azeotroping agent such as toluene or xylene.

Examples of simple curatives which can be prepared by the above procedure and are useful in the sealant composition of this invention are 1,2-ethylene bis(isopentylidene imine), 1,2-hexylene bis(isopentylidene imine), 1,2-propylene bis(isopentylidene imine), p,p'-bisphenylene bis(isopentylidene imine), 1,2-ethylene bis(isopropylidene imine), 1,3-propylene bis(isopropylidene imine), p-phenylene bis(isopentylidene imine), m-phenylene bis(isopropylidene imine), and 1,5-naphthylene bis(isopropylidene imine). Alternatively, the polyfunctional amine used to prepare the ketimine (3) can be polymeric, where examples of Q can include polyethers, polyesters, polyurethanes and polydienes with polyethers being preferred. An example is a diketimine prepared from Jeffamine D-400 diamine sold by Texaco Chemical Company, Tex., U.S.A. Since the multifunctional imine curative should be free of any amine functionality, excess quantities of the ketone or aldehyde are desirably used in forming the curative.

After the sealant has been applied and exposed to the atmosphere, the multifunctional imine is hydrolyzed by atmospheric moisture. This liberates a primary amine which cures the sealant by substitution of the phenol group in (8), and reacts with the resulting NCO-terminated prepolymer chains to producing urea linkages with chain extension and crosslinking. The ratio of equivalents, $NH_2$: NCO in the sealant is preferably in the range from 0.8 to 1.1.

In addition to the aforesaid components, the sealant may include other conventionally used ingredients such as a solvent extender for ease of application, as well as compounding ingredients such as fillers, thixotropic agents, other extenders, pigments, etc. Since the presence of moisture in the composition is undesirable, all components and additives in the sealant are essentially free of moisture.

Quite unexpectedly, sealants formulated as described herein exhibit an improvement in rate of cure and in shelf life with a wide range of aliphatic isocyanates and relatively high molecular weight polyols indicating that the improvement is relatively insensitive to the specific aliphatic isocyanate or, the particular polyol used, though the polyether polyols are most preferred.

In the following illustrative examples, all 'parts' refer to parts by weight unless otherwise specified.

EXAMPLE 1
Preparation of blocked IPDI-terminated Polyol:

A 3-neck, 250 mL flask was fitted with a short Vigreux fractionation column, stir bar, thermocouple/controller, nitrogen (or argon) inlet, and bubbler. The flask was charged with 30.0 g of a poly(propylene oxide) polyol, n=2.3 (OH no. 26, 14.6 mequiv OH) and 195 mL of toluene. The solution was stirred as 150 mL of toluene was distilled under nitrogen to azeotropically dry the system. The solution was then cooled to room temperature and 3.46 g (31.2 mequiv) of IPDI was injected. A small sample was removed (syringe) and placed between KBr discs. The initial NCO level was determined from the infrared band ratio, $R_o = A_{2265}/A_{925}$. This measurement was made three times and averaged. During the subsequent reaction, NCO conversion was periodically measured in the same way, where % NCO conv.= $[1-R/R_o] \times 100$. The solution was heated to 105° C. and 2.8 mL of a solution comprising 0.60 g of dibutyltindilaurate/ 200 mL of toluene was injected. This delivers 0.0084 g of catalyst. A constant NCO conversion of 44% is reached in about 60 min. The substituted phenol (0.029 mol, 75% excess) was then added as a solid, and the monitoring of NCO conversion continued. With methyl 4-hydroxybenzoate, a limiting NCO conversion of 84% is reached in about 24 hr. It increases to 86% after 5 days in a desiccator at room temperature.

EXAMPLE 2
Cure Recipe and Preparation of Specimens:

The data summarized in the following Table were obtained with prepolymer prepared with 75% excess phenol. The percent solids of the polyurethane prepolymer/toluene solution was determined with 0.5 to 1.0 g samples in 57 mm aluminum weighing dishes (Fisher). These were heated on a hot plate to constant weight. Care must be taken to avoid heating at a temperature where thermal decomposition occurs. This measurement is made accurately to account for the removal and loss of toluene during the synthesis. The total weight of prepolymer solution (W) is calculated as follows:

$$W = g(polyol) + g(phenol) + g(IPDI) + g(toluene)$$

where:

$$g(toluene) = \left[ \frac{g\ solids\ charged}{fraction\ solids} \right] - [g\ solids\ charged]$$

Available NCO in Prepolymer Solution (meq/g):
(a) NCO consumed by polyol: [0.486 meq/g polyol]×g polyol/W
(b) NCO available from IPDI: [g (IPDI)/222.2 g/mol]×2 NCO equiv/mol×1000/W.
(c) Net Available as Blocked and Free NCO: (b)−(a).

Curative Required (g) for 20 g of Prepolymer Solution:
20 g×(c)×0.85×g curative/meq
where curative=diketimine of an α,ω-diamine-terminated PPO, 3.3 mequiv. amine/g.

The above prepolymer solution and curative were combined in a nitrogen-filled glove bag and thoroughly mixed. Several samples were then prepared by weighing 1.5 g of the mixture into 57 mm aluminum weighing dishes (Fisher). They were then stored at 50% relative humidity, 25° C. A sample was periodically removed and the viscosity measured with a Brookfield Digital Rheometer. The first sample (zero time) was placed in vacuum oven (room temperature) for 10 min to remove solvent.

EXAMPLE 3
Preparation of Specimens for One-step Stability Test:

Approximately 17 g of the cure recipe was prepared in a nitrogen-filled glove bag as described above. Serum bottles (10 mL, 50×25 mm) were then charged with 1.5 g of the mixture and tightly capped with Teflon® polymer-lined rubber gaskets. This operation was also performed in the glove bag. The bottles were then placed in an oven and maintained at 50° C. Individual bottles were periodically removed and the viscosity measured on a Brookfield Rheometer. However, sampling frequency proved to be too high in most cases, and the stability test was continued by noting the time required for the remaining one or two specimens to become immobile. That is defined as the time required for no visible flow to occur upon inverting the bottle.

EXAMPLE 4
Preparation of Sulfonyl and Sulfinyl Phenol Blocking Agents:

Chlorophenylsulfonylphenol (or 4-(4'-chlorophenylsulfonyl phenol)) can be prepared by the known selective hydrolysis of bis(4-chlorophenyl)sulfone as taught by Johnson, et al. in J. Polym. Sci. Part A-1, 1967, 5, 2415. The structure was confirmed by NMR.

4-Methylsulfonylphenol was synthesized according to the teachings of Schultz et al. [J. Org. Chem., 1963, 28, 1140,] and Itsuda [Jap. Pat. 01149762 A2], incorporated herein by reference, by oxidation of 4-(methylmercapto)phenol using hydrogen peroxide. After oxidation was complete, sodium sulfite was used to destroy any residual peroxide. 4-methylsulfonylphenol was obtained in 79% yield, uncontaminated by 4-methylsulfinylphenol (NMR).

4-Methylsulfinylphenol was synthesized according to the teachings of Drabowicz et al. [Synthesis, 1990, 937], incorporated herein by reference, by oxidation of 4-(methylmercapto)phenol using hydrogen peroxide. After completion of the oxidation, sodium sulfite was used to destroy any residual peroxide. 4-Methylsulfinylphenol was obtained in 75% yield, uncontaminated by 4-methylsulfonylphenol (NMR).

In the following Table I, all samples are prepared and tested with no compounding agents conventionally used to prepare a sealant for use in commercial applications because the examination of the effect of the combination of polyisocyanate and phenyl substituent in the combination of (6)+(7) was of interest. Control I is made with the blocked PPO prepolymer which is used in a commercially available sealant; control II is made with a blocked PPO prepolymer synthesized in the laboratory. The comparison indicates that both sealants cured in the same time and had the same stability. Since the same PPO prepolymer was capped with IPDI blocked with various substituents it will be evident that the differences recorded are due solely to the combination of the IPDI and the particular substituent on the phenol.

TABLE
COMPARISON OF CURE RATES AND ONE-STEP STABILITY

| | Diisocyanate | Phenol Substituent | Cure Hrs to 100K Cp[a] | Cure Hrs (rel) | Stability Gel Time[c] (days) | $\sigma_p$ |
|---|---|---|---|---|---|---|
| control I | TDI[d] | 4-nonyl | 8.6 | 2.1 | 11–14 | −0.20 |
| control II | TDI | 4-nonyl | 8.7 | 2.1 | 11 | −0.20 |
| unblocked control | IPDI[e] | not blocked | 3.2 | 0.76 | 10–14 | |
| | IPDI | 4-CO$_2$CH$_3$ | 4.2 | 1.0 | 66–70 | +0.43 |
| | IPDI | 4-COC$_6$H$_5$ | 3.0 | 0.71 | 32 | +0.46 |
| | IPDI | 4-COCH$_3$ | 4.9 | 1.2 | 17–21 | +0.47 |
| | IPDI | 3-CO$_2$CH$_3$ | 13. | 3.1 | 69–77 | +0.33 |
| | IPDI | 2-CO$_2$CH$_3$ | no blocking occurs | | | |

TABLE-continued
COMPARISON OF CURE RATES AND ONE-STEP STABILITY

| | Diisocyanate | Phenol Substituent | Cure Hrs to 100K Cp[a] | Cure Hrs (rel) | Stability Gel Time[c] (days) | $\sigma_p$ |
|---|---|---|---|---|---|---|
| | IPDI | 4-CH$_3$ | ~132[b] | | | −0.16 |
| | IPDI | 4-Cl | 16. | | | +0.24 |
| | IPDI | 4-methylsulfoxyl | 3.5 | 0.83 | 40 | +0.49 |
| | IPDI | 4-methylsulfonyl | 2.25 | 0.54 | 55 | +0.73 |
| | IPDI | 4-(4-chlorophenyl sulfonyl) | 2.5 | 0.6 | 45–50 | ≈+0.7 |
| | TMHD[f] | 4-CO$_2$CH$_3$ | 5.6 | 1.3 | 45–52 | +0.43 |
| | H$_6$XDI[g] | 4-CO$_2$CH$_3$ | 4.2 | 1.0 | 36–39 | +0.43 |
| | IPDI | 4-CO$_2$CH$_3$ | 3.7 | 0.88 | 61–68 | +0.43 |
| Barron et al | TDI | 4-OCH$_3$ | | | | ≈−.12 |
| Barron et al | TDI | 4-Cl | 2.0 | 0.48 | 2.8–5.8 | +0.24 |

[a]centipoise
[b]90.4 × 10$^3$ cp at 132 hr
[c]no flow when bottle inverted
[d]toluene diisocyanate (aromatic)
[e]isophorone diisocyanate (aliphatic)
[f]trimethylhexamethylene diisocyanate (aliphatic)
[g]1,3-bis(isocyanatomethyl)cyclohexane (aliphatic)

All the prepolymer compositions in the above Table were made using the polyol described in Example 1 except the last entry in the Table. It was prepared with a triol analogue (n=3) having approximately the same OH number, 29.

The cure times required to reach a viscosity of 100K cp are recorded in the first column of data. Cure times relative to that of the prepolymer blocked with 4-carbomethoxy phenol are recorded in the second column of data and are obtained by dividing all the cure times by 4.2 hr. Substituents which have negative values for the Hammett constant are electrondonating and require relatively longer cure times, or "slow cure rates", while those with positive values are electron-withdrawing and require shorter cure times, or have "rapid cure rates".

The stability for the samples made with 4-Cl and 4-CH$_3$ substituents was not measured because their cure rates were so slow. Despite their predictable very long shelf life, such substituents would not be practical in a commercial sealant.

The following conclusions result from the Table:

(1) In the system where (8) is produced from an aliphatic diisocyanate (IPDI) and a substituted phenol where X=4-CO$_2$CH$_3$, 4-COCH$_3$, 4-COPh, 4-methylsulfinyl and 4-methylsulfonyl, all cure substantially faster than the control derived from an aromatic diisocyanate (TDI) and the blocking phenol where X=nonyl. Moreover, cure rates are similar to the unblocked control, showing that they provide nearly the maximum cure rate possible.

(2) All members of this faster curing system have substantially superior one-step stability as compared to the control, by as much as a factor of six. In comparison to the control, prepolymers blocked with a phenol having a substituent with $\sigma_p$ from 0.33 to 0.73 yield sealants which cure at least twice as rapidly as the control and have shelf stability at least twice as long.

(3) The position of the substituent X in the phenol has a large influence on cure rate and blocking. 4-CO$_2$CH$_3$ gives about a three-fold faster cure than 3-CO$_2$CH$_3$, while 2-CO$_2$CH$_3$ does not block at all.

(4) Although there are some differences in degree, aliphatic diisocyanates, in general, can be employed in this design of the prepolymer (8) and behave similarly.

The cure data in the Table can be correlated with Hammett substituent constants, as summarized in the FIGURE. That is, one finds a linear correlation in the plot of log cure time with the Hammett $\sigma_p$ constant for the blocking phenol substituent. The substituents corresponding to the points on the curve are designated in the FIGURE. As is evident from the Table, when $\sigma_p$ is about 0.45 the cure rate is about the same as that of the unblocked isocyanate-terminated prepolymer. Accordingly, it will be apparent that there is no reason to provide substituents with $\sigma_p>0.45$ unless there is a substantial gain in shelf life, an economic benefit, or some other compelling reason.

The main discrepancy to the correlation presented in the FIGURE is the only example in the series where the substituent is located in the 3-position (3-$CO_2CH_3$). Thus, the cure rates for this system obey a relationship similar to that of rate constants for numerous organic reactions that occur at functional groups attached to substituted aromatic rings. The Hammett treatment is fully discussed in J. March, *Advanced Organic Chemistry*, John Wiley & Sons, New York, 1985, Ed 3, pp. 242, and comprehensive tables of $\sigma$ constants can be found in O. Exner, "Correlation Analysis in Chemistry, Recent Advances," N. B. Chapman and J. Shorter, Eds, Plenum Press, New York, 1978, 500. This correlation provides a rational basis for selecting the appropriate phenol substituent, X. In general, the most desirable are those where $\sigma_p>0.24$.

EXAMPLE 5

A sealant with conventional compounding ingredients was prepared as in the '443 patent by mixing together 2200 liters of the above-described blocked isocyan-ate-terminated polymer, 360 kilograms of a thixotropic agent (Thixcin R produced by NL Industries, Inc.) and 975 kilograms of dried calcium carbonate (filler). After the charge was mixed for 10 minutes, 79 kilograms of methyltrimethoxysilane and 20 kilograms of methyl alcohol were added to the charge. Mixing was continued for 1 hour. 22.56 kilograms of aminopropyltrimethoxysilane, 87.5 kilograms of processing oil (Sunthene 311 produced by Sun Oil Company) and a triarylphosphate plasticizer then were added to the charge. Mixing was continued for 20 minutes under a vacuum of 38 cm of mercury. Thereafter, 192 kilograms of the ketimine reaction product were added to the mix and mixing under a vacuum of 38 cm of mercury was continued for 15 minutes. The resulting sealant composition was loaded into caulking cartridges under nitrogen.

Based on 100 parts by weight of blocked prepolymer the sealant has the following formulation:

| Material | Parts By Weight |
| --- | --- |
| Blocked isocyanate-terminated polymer, (solids basis of Example 1) | 100 |
| Thixotropic agent (Thixcin R) | 15.7 |
| Filler (Calofort S - calcium stearate coated calcium carbonate) | 42.5 |
| Colorant | 7.5 |
| Aminopropyltriethoxysilane | 1.0 |
| Methyltrimethoxysilane | 3.5 |
| Methanol | .88 |
| Processing oil (Sunthene 311) | 3.9 |
| Tricresyl phosphate | 15.9 |
| Ketimine (of Example I) | 8.5 |

The sealant shows excellent stability upon being stored in sealed containers and develops desired Shore A hardness after being exposed for less than 3 weeks to a 50% RH atmosphere at 25° C.

I claim:

1. A composition comprising a moisture-curable sealant, curable at ambient temperature, said sealant consisting essentially of (a) an aliphatic polyisocyanate-terminated polyol having a molecular weight in the range from 1,000 to 18,000, wherein isocyanate groups are blocked with phenol groups each having a substituent producing an electron-withdrawing effect quantified by a Hammett constant $\alpha_p$ in the range from >0.24 to about 0.73; and (b) a sufficient amount of a multifunctional imine curative to generate a multifunctional amine which displaces said phenol groups during chain extension and crosslinking in the presence of said moisture; whereby said moisture-curable sealant, when exposed to atmospheric moisture, is cured to a viscosity of 100,000 cp in less than one-half the time required for an aromatic polyisocyanate-terminated polyol having a molecular weight in the range from 1,000 to 18,000, wherein isocyanate groups are blocked with nonyl phenol; and, when sealed under an inert gas in a container at 25° C. in an atmosphere having 50% relative humidity, has a shelf life of at least nine months.

2. A method for preparing an ambient temperature moisture curable one-step curable polyurethane sealant having extended shelf life and accelerated curing time said method comprising, (a) blocking an aliphatic polyisocyanate-terminated polyol with a substituted phenol wherein substituent X on the phenyl group has a Hammett constant $\alpha_p$ in the range from >0.24 to ≈0.73 to yield a blocked prepolymer represented by the formula:

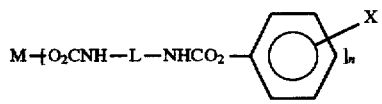

wherein, n represents a number in the range from 2 to 6;

M represents a polymer component derived from a hydroxyl-terminated polyol $M(OH)_n$ selected from the group consisting of a polyether polyol, a polyester polyol, a polyurethane polyol and a hydroxyl-terminated polybutadiene;

L represents an organic residue of an aliphatic diisocyanate $L(NCO)_2$; and,

X represent said substituent; said blocked prepolymer having at least 85% of the NCO groups blocked; and, (b) mixing said blocked prepolymer with a multifunctional imine essentially free of amine functionality formed by the condensation reaction between a primary multifunctional amine with a ketone or aldehyde, said multifunctional amine represented by

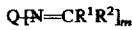

wherein, Q is an organic radical having a molecular weight from about 26 to 10,000;

m is an integer ≧2, preferably in the range from 2 to 4; and, $R^1$ and $R^2$ are independently selected from the group consisting of H, $C_1$–$C_{10}$-alkyl, phenyl, and $C_1$–$C_6$ alkyl-substituted phenyl; and, (c) sealing the sealant in a container under an inert gas atmosphere;

whereby, the sealant in the container has a shelf life of at least nine months at 25° C. in a 50% relative humidity atmosphere; and, when the sealant is applied and exposed to the ambient atmosphere, it cures to 100K cp in less than 8 hr.

3. The composition of claim 1 wherein said blocked prepolymer is represented by the formula

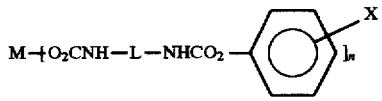

wherein, n represents a number in the range from 2 to 6;

M represents a polymer component derived from a hydroxyl-terminated polyol M(OH)$_n$ selected from the group consisting of a polyether polyol, a polyester polyol, a polyurethane polyol and a hydroxyl-terminated polybutadiene;

L represents an organic residue of an aliphatic diisocyanate L(NCO)$_2$; and,

X represents said substituent.

4. The composition of claim 2 wherein said aliphatic polyisocyanate is a diisocyanate.

5. The composition of claim 4 wherein said diisocyanate is selected from the group consisting of isophorone diisocyanate, trimethylhexamethylene diisocyanate and hydrogenated m-xylene diisocyanate.

6. The composition of claim 5 wherein said substituent X is selected from the group consisting of Cl, —COR (acyl), —CO$_2$R (ester), —COH (formyl), —SO$_2$R (sulfonyl), and —SOR (sulfinyl), wherein R is an aliphatic or alicyclic group having from 1 to 12 carbon atoms, or an aromatic group having from 6 to 20 carbon atoms.

7. The composition of claim 6 wherein said M is derived from polypropylene oxide, said aliphatic isocyanate is isophorone diisocyanate, and, X is sulfinyl.

8. The composition of claim 1 wherein said multifunctional imine curative is represented by the formula

wherein, Q is an organic radical having a molecular weight from about 26 to 10,000;

m is an integer in the range from 2 to 4; and,

R$^1$ and R$^2$ are independently selected from the group consisting of H, C$_1$–C$_{10}$-alkyl, phenyl, and C$_1$–C$_6$ alkyl-substituted phenyl.

9. The composition of claim 7 wherein the imine curative is a diketimine or dialdimine derived from an α,ω-diamine-terminated poly(propylene oxide).

10. The composition of claim 8 wherein the imine curative is a diketimine or dialdimine derived from an α,ω-diamine-terminated poly(propylene oxide).

11. In a sealant comprising (a) an aliphatic polyisocyanate-terminated polyol in which essentially all NCO groups are blocked by reaction with a substituted phenol, (b) a multi-functional imine essentially free of amine functionality formed by the reaction between a primary multi-functional amine with a ketone or aldehyde, said multi-functional imine having the formula

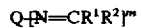

wherein, Q is an organic radical having a molecular weight from about 26 to 10,000;

m is an integer ≧2, preferably in the range from 2 to 4; and,

R$^1$ and R$^2$ are independently selected from the group consisting of H, C$_1$–C$_{10}$-alkyl, phenyl, and C$_1$–C$_6$ alkyl-substituted phenyl; and, (c) from 0.1 to 10 parts by weight of an organosilane based upon 100 parts by weight of said blocked isocyanate-terminated prepolymer, said organosilane being selected from the group consisting of aminosilanes, the reaction product of a mercaptosilane with a monoepoxide, the reaction product of an epoxysilane with a secondary amine, and the reaction product of an aminosilane with an acrylic monomer, the improvement comprising, said blocked prepolymer is an aliphatic polyisocyanate-terminated prepolymer having a molecular weight in the range from 1000 to 18,000, and said substituted phenol has a substituent producing an electron-withdrawing effect quantified by a Hammett constant σ$_p$ in the range from >0.24 to about 0.73.

12. The composition of claim 11 wherein said blocked prepolymer is represented by the formula

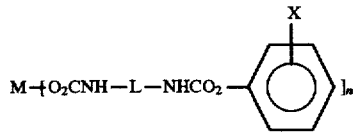

wherein, n represents a number in the range from 2 to 6;

M represents a polymer component derived from a hydroxyl-terminated polyol M(OH)$_n$ selected from the group consisting of a polyether polyol, a polyester polyol, a polyurethane polyol and a hydroxyl-terminated polybutadiene;

L represents an organic residue of an aliphatic diisocyanate L(NCO)$_2$;

X represents said substituent.

13. The composition of claim 12 wherein said aliphatic polyisocyanate is a diisocyanate.

14. The composition of claim 13 wherein said diisocyanate is selected from the group consisting of isophorone diisocyanate, trimethylhexamethylene diisocyanate and hydrogenated m-xylene diisocyanate.

15. The composition of claim 14 wherein said substituent X is selected from the group consisting of Cl, —COR (acyl), —CO$_2$R (ester), —COH (formyl), —SO$_2$R (sulfonyl), and —SOR (sulfinyl), wherein R is an aliphatic or alicyclic group having from 1 to 12 carbon atoms, or an aromatic group having from 6 to 20 carbon atoms.

16. The composition of claim 15 wherein said M is derived from polypropylene oxide, said aliphatic isocyanate is isophorone diisocyanate, and, X is sulfinyl.

* * * * *

UNITED STATES PATENT AND TRADEMARK OFFICE
CERTIFICATE OF CORRECTION

PATENT NO. : 5,786,437
DATED : July 28, 1998
INVENTOR(S) : Nicholas

It is certified that error appears in the above-indentified patent and that said Letters Patent is hereby corrected as shown below:

Column 14, line 52, the formula should be:

$$Q-[-N=CR^1R^2]_m$$

Column 15, line 36, the formula should be:

$$Q-[-N=CR^1R^2]_m$$

Column 15, line 59, the formula should be:

$$Q-[-N=CR^1R^2]_m$$

Column 16, line 6 should be:

"consisting of H, $C_1-C_{10}$-alkyl, phenyl, and $C_1-C_6$".

Signed and Sealed this

Nineteenth Day of January, 1999

Attest:

*Acting Commissioner of Patents and Trademarks*

Attesting Officer